United States Patent
Hwang et al.

(10) Patent No.: US 7,408,857 B2
(45) Date of Patent: *Aug. 5, 2008

(54) METHOD AND APPARATUS FOR MANAGING DEFECTS IN RECORDING MEDIA, A COMPUTER READABLE MEDIUM INCLUDING COMPUTER READABLE CODE FOR THE SAME, AND A DEFECT MANAGED RECORDING MEDIUM OBTAINED USING THE SAME METHOD, APPARATUS, AND COMPUTER READABLE MEDIUM

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,879

(22) Filed: May 10, 2006

(65) Prior Publication Data

US 2006/0203667 A1   Sep. 14, 2006

Related U.S. Application Data

(63) Continuation of application No. 11/227,922, filed on Sep. 16, 2005, which is a continuation of application No. 10/799,599, filed on Mar. 15, 2004.

(60) Provisional application No. 60/472,121, filed on May 21, 2003.

(30) Foreign Application Priority Data

May 1, 2003   (KR) ............... 2003-28040
May 15, 2003   (KR) ............... 2003-30950

(51) Int. Cl.
*G11B 7/00*   (2006.01)

(52) U.S. Cl. ................... 369/53.17; 369/47.14
(58) Field of Classification Search ............. 369/47.14, 369/53.17
See application file for complete search history.

(56) References Cited

U.S. PATENT DOCUMENTS 6,249,884 B1   6/2001   Joo (Continued)

FOREIGN PATENT DOCUMENTS

CN   1338103 A   2/2002

(Continued)

OTHER PUBLICATIONS

U.S. Appl. No. 10/799,599, filed Mar. 15, 2004, Sung-hee Hwang et al, Samsung Electronics Co., Ltd.

(Continued)

*Primary Examiner*—Wayne Young
*Assistant Examiner*—LaTanya Bibbins
(74) *Attorney, Agent, or Firm*—Stein, McEwen & Bui, LLP

(57) ABSTRACT

A method, apparatus and computer readable medium for managing recording medium defects and a defect managed recording medium. The recording medium includes a spare area in which a replacement area, which is a substitute for a defective area of the recording medium, is formed, and a temporary defect management area in which temporary management information that specifies the defective area and the corresponding replacement area is recorded, wherein position information and state information regarding the defective area are recorded in the replacement area. Accordingly, it is possible to restore defect information even if recording medium defect management on the recording medium ended abnormally.

3 Claims, 6 Drawing Sheets

U.S. PATENT DOCUMENTS

| | | | |
|---|---|---|---|
| 6,367,049 B1 | 4/2002 | Van Dijk et al. | |
| 6,385,736 B1 | 5/2002 | Jeong et al. | |
| 6,529,458 B1 | 3/2003 | Shin | |
| 2002/0136537 A1* | 9/2002 | Takahashi | 386/95 |
| 2004/0218488 A1* | 11/2004 | Hwang et al. | 369/44.32 |

FOREIGN PATENT DOCUMENTS

| | | |
|---|---|---|
| KR | 2004-28469 | 4/2004 |
| WO | WO 00/54274 | 9/2000 |

OTHER PUBLICATIONS

U.S. Appl. No. 11/227,922, filed Sep. 16, 2005, Sung-hee Hwang et al, Samsung Electronics Co., Ltd.

U.S. Appl. No. 11/437,329, filed May 12, 2006, Sung-hee Hwang et al, Samsung Electronics Co., Ltd.

Office Action issued in Taiwanese Patent Application No. 93111563 on Jun. 6, 2007.

Office Action issued in Chinese Patent Application No. 2004800110970 on Jan. 26, 2007.

* cited by examiner

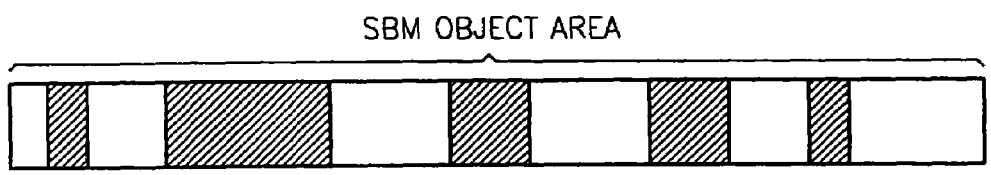
FIG. 6A   RECORDING MEDIUM RECORDING STATE INDICATED IN SBM
AS NOT BEING RESTORED
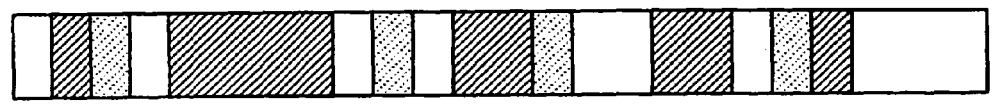
FIG. 6B   ACTUAL RECORDING MEDIUM RECORDING STATE
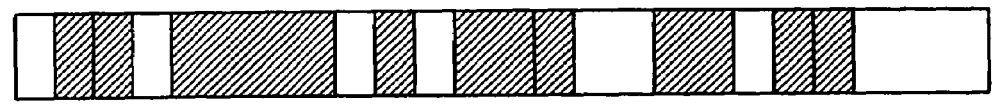
FIG. 6C   RECORDING MEDIUM RECORDING STATE INDICATED IN
SBM AS BEING RESTORED

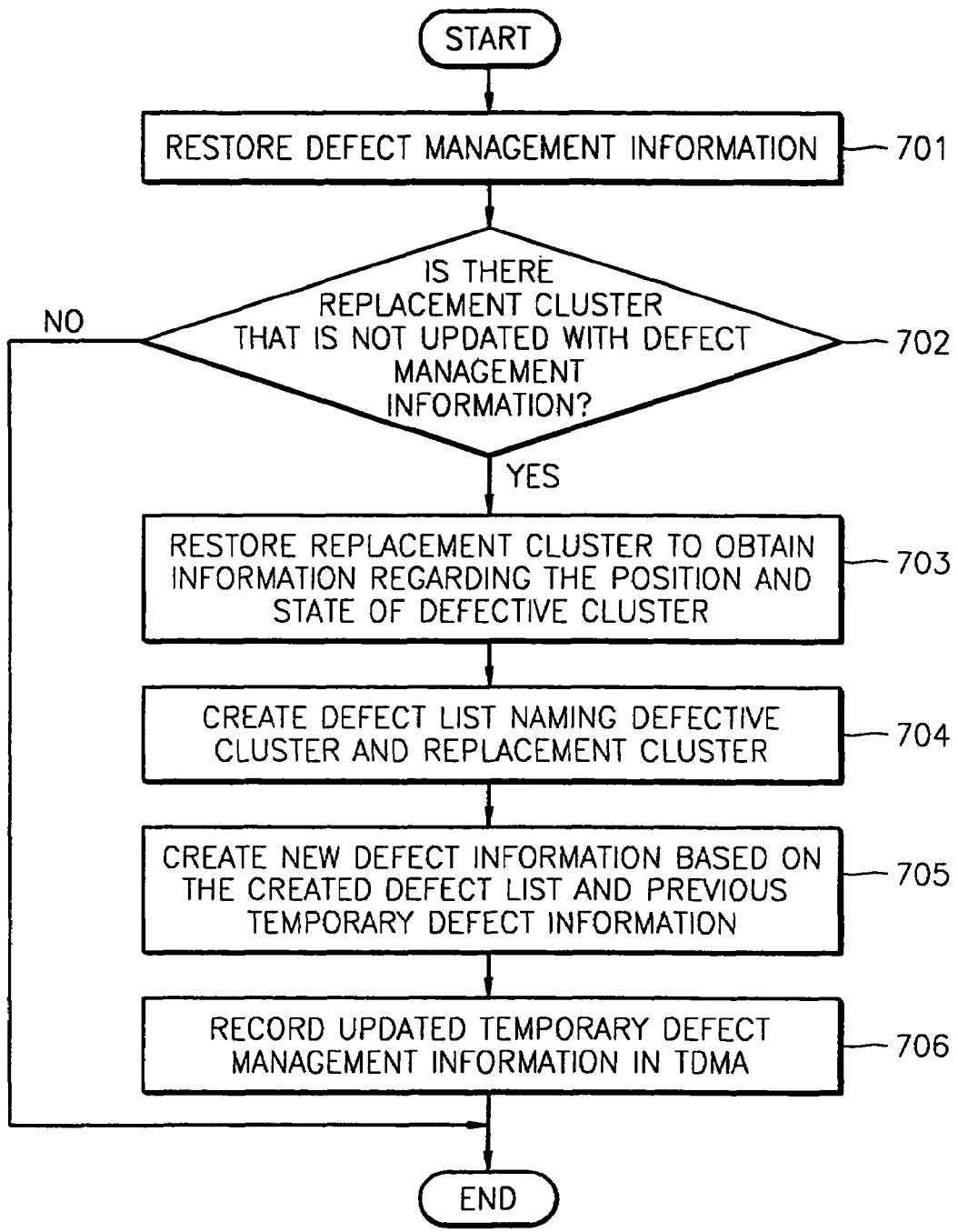

METHOD AND APPARATUS FOR MANAGING DEFECTS IN RECORDING MEDIA, A COMPUTER READABLE MEDIUM INCLUDING COMPUTER READABLE CODE FOR THE SAME, AND A DEFECT MANAGED RECORDING MEDIUM OBTAINED USING THE SAME METHOD, APPARATUS, AND COMPUTER READABLE MEDIUM

CROSS-REFERENCE TO RELATED APPLICATIONS

This application is a continuation of U.S. patent application Ser. No. 11/227,922, filed Sep. 16, 2005, now pending, which is a is a continuation of U.S. patent application Ser. No. 10/799,599, filed Mar. 15, 2004, now pending, which claims the benefit of Korean Patent Application Nos. 2003-28040 and 2003-30950, filed on May 1, 2003, and May 15, 2003, respectively, in the Korean Intellectual Property Office, and U.S. Patent Provisional Application No. 60/472,121 filed on May 21, 2003, the disclosures of which are incorporated herein in their entirety by reference.

BACKGROUND OF THE INVENTION

1. Field of the Invention

The present invention relates to defect management for recording media, and more particularly, to a method, apparatus, and computer readable medium for performing management of defects of a recording medium even when defect management of the recording medium is abnormally terminated, and a defect managed recording medium obtained using the same method, apparatus, and computer readable medium.

2. Description of the Related Art

Defect management includes a process of rewriting data stored in a defective area of a user data area of a recording medium in a new portion of the user data area, thereby compensating for data loss caused by the defective area. In general, defect management is performed using linear replacement or slipping replacement. In linear replacement, data stored in the defective area of the user data area is recorded in a spare data area having no defects. In slipping replacement, the defective area of the user data area is skipped and the next available area of the user data area having no defects is used.

Both linear replacement and slipping replacement are, however, applicable only to recording media such as a DVD-RAM/RW discs, on which data can be repeatedly written and recording can be performed using a random access method. It is difficult to perform linear replacement and slipping replacement on write once recording media, where recording is allowed only once. In general, the presence of defects in a recording medium is detected by recording data on the recording medium and then confirming whether or not data has been written correctly on the recording medium. However, once data is written on a write once recording medium, it is impossible to thereafter overwrite new data and manage defects on the write once recording medium.

Other methods, apparatuses, and computer readable media for managing defects on write once recording media, where written data cannot be erased or rewritten, include the methods, apparatuses, and media potentially including the use of a reproducing and/or recording medium drive, to produce a defect managed write once recording medium.

However, the defect management performed by a reproducing and/or recording medium drive can be abnormally discontinued due to an unavoidable accident, e.g., when power supplied to the reproducing and/or recording medium drive is interrupted due to a power failure. Therefore, an apparatus, method, and computer readable medium has been developed and described herein to generate a resultant defect managed recording medium regardless of such interruptions.

SUMMARY OF THE INVENTION

The present invention provides a method, apparatus, and computer readable medium for performing defect management on a recording medium where defect management was abnormally terminated due at least to an unavoidable accident such as a power failure, and a defect managed write once disc implementing compensation for the same.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a recording medium, including a spare area storing a replacement area that is a substitute for a defective area of the recording medium, and a temporary defect management area storing temporary management information identifying the defective area and the replacement area, wherein position information and state information regarding the defective area are recorded in the replacement area.

The position information and state information regarding the defective area may be error-correction code (ECC) encoded during ECC encoding of data recorded in the replacement area. Alternatively, ECC encoded data and the position information and state information are recorded in the replacement area.

To accomplish the above and/or other aspects and advantages, embodiments of the present invention provide a method of managing a defect in a recording medium, including recording a replacement area for a defective area of the recording medium in a spare area, and recording temporary management information identifying the defective area and the corresponding replacement area in a temporary defect management area of the recording medium, wherein position information and state information regarding the defective area are recorded in the replacement area.

The method may further include recording temporary management information, which is lastly recorded in the temporary defect management area, in a defect management area (DMA) during a finalizing of the recording medium. The lastly recorded temporary management information may be recorded in the DMA in at least one of a lead-in area and a lead-out area of the recording medium.

To accomplish the above and/or other aspects and advantages, embodiments of the present invention provide an apparatus, including a recording/reading unit recording data to and/or from a recording medium, and a controller controlling the recording of data to a replacement area, for a defective area of the recording medium, in a spare area of the recording medium, the recording/reading unit to record temporary management information identifying the defective area and the replacement area in a temporary defect management area, and controlling the recording/reading unit to record position information and state information regarding the defective area in the replacement area.

To accomplish the above and/or other aspects and advantages, embodiments of the present invention provide a method of managing a defect in a recording medium, including determining whether recording medium defect management has been successfully completed, reading lastly recorded defect information from a replacement area, of the recording medium, for a defective area of the recording medium, and creating new defect information when the recording medium defect management is determined to have not been successfully completed, and updating defect management information in a defect management area (DMA) of the recording medium based on the generated defect information.

The determining of whether the recording medium defect management was successfully completed may be determined by checking a consistency flag on the recording medium.

The generating of the new defect information may further include reading position information regarding the defective area from the replacement area. The generating of the new defect information may further include generating new defect information based on previous defect information and the read defect information.

To accomplish the above and/or other aspects and advantages, embodiments of the present invention provide a method of managing a defect in a recording medium, including determining whether recording medium defect management has been previously successfully completed, scanning a portion of the recording medium purportedly containing no recorded data, as identified in a spare bit map (SBM), and verifying whether the portion contains no recorded data, and updating the SBM to precisely reflect a recording state of the recording medium based on the verification of the portion of the recording medium.

The updating of the SBM may further include recording an updated SBM as temporary management information in a temporary defect management area on the recording medium.

To accomplish the above and/or other aspects and advantages, embodiments of the present invention provide an apparatus, including a recording/reading unit recording data to and/or from a recording medium, and a controller determining whether recording medium defect management has previously been successfully completed, controlling the recording/reading unit to record lastly recorded defect information from a replacement area and generate new defect information when the recording medium defect management is determined to not have previously been successfully completed, and controlling the recording/reading unit to update a defect management area (DMA) of the recording medium, based on the generated defect information.

To accomplish the above and/or other aspects and advantages, embodiments of the present invention provide an apparatus, including a pickup recording data to and/or from a recording medium, and a controller controlling the pickup to record and/or read data to determine whether recording medium defect management has previously been successfully completed, and scanning a portion of the recording medium purportedly containing no recorded data, as identified in a lastly recorded spare bit map (SBM) on the recording medium, in order to verify whether data is recorded in the portion when the recording medium defect management is determined to not have previously been successfully completed, and updating the SBM to precisely reflect the recording state of the recording medium based on the verification of the portion of the recording medium.

The controller may control the recording of the updated SBM as temporary management information in a temporary defect management area of the recording medium.

To accomplish the above and/or other aspects and advantages, embodiments of the present invention provide a computer-readable medium including computer readable code for controlling a reproducing and/or recording apparatus to perform any of the above methods.

BRIEF DESCRIPTION OF THE DRAWINGS

The above and/or other aspects and advantages of the present invention will become more readily appreciated from the following description of the embodiments taken in conjunction with the accompanying drawings in which:

FIGS. 6A-6C illustrate diagrams explaining a method of restoring a spare bit map (SBM), which is a type of temporary management information, according to another embodiment of the present invention; and FIG. 7 is a flowchart illustrating a recording medium defect management method, according to another embodiment of the present invention.

DETAILED DESCRIPTION OF THE PREFERRED EMBODIMENTS

Figure 1A:
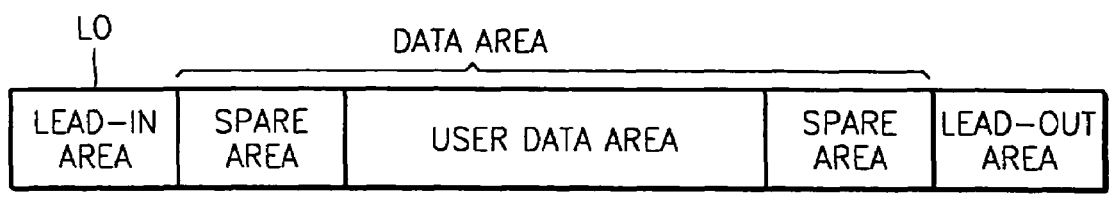
FIGS. 1A and 1B illustrate data structures of a write once recording medium with a temporary defect management area (TDMA) and a defect management area, according to reproducing and/or recording embodiments of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures. Hereinafter, preferred embodiments of the present invention will be described with reference to the accompanying drawings.

Figure 1B:
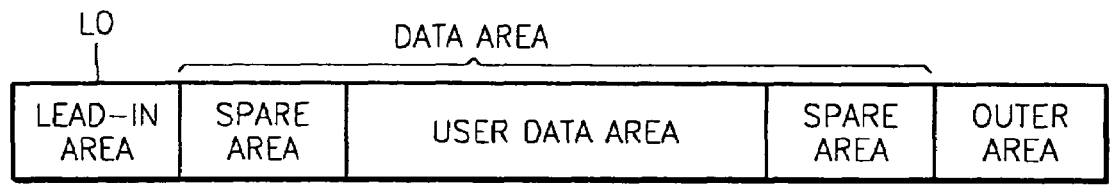
Figure 1B:
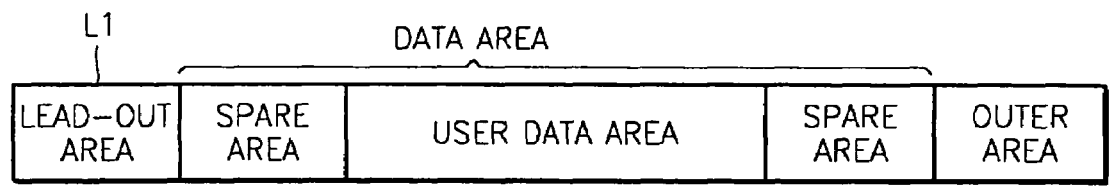

FIGS. 1A and 1B illustrate structures of a recording medium 100, according to embodiments of the present invention.

FIG. 1A illustrates a single recording layer recording medium representation of the recording medium 100 having a recording layer L0. The recording medium 100 includes a lead-in area, a data area, and a lead-out area. The lead-in area is located in an inner part of the recording medium 100 and the lead-out area is located in an outer part of the recording medium 100. The data area is present between the lead-in area and the lead-out area. In this embodiment, the start and end of the data area are the same as those of a CD rewritable (CD RW), and the data area is sequentially divided into a spare area, a user data area, and a spare area, starting from the inner part of the recording medium 100. The user data area is an area where user data is written, and the spare areas serve to compensate for loss in the recording space of the user data area due to defects. Since defects may occur on the recording medium 100, it is preferable that the sizes of the spare areas be allocated such that a large amount of data can still be written on the recording medium 100. In this embodiment, positions of the spare areas are not fixed. At least one of a defect management area and a temporary defect management area is present in at least one of the lead-in area and the lead-out area.

FIG. 1B illustrates a double recording layer recording medium representation of the recording medium 100, having two recording layers L0 and L1. A lead-in area, a data area, and an outer area are sequentially formed from the inner part of the first recording layer L0 to its outer part of first recording layer L0. Similarly, an outer area, a data area, and a lead-out area are sequentially formed from the outer part of the second recording layer L1 to the inner part of the second recording layer L1. Unlike the single recording layer recording medium of FIG. 1A, the lead-out area is present in the inner part of the recording medium 100 of FIG. 1B. That is, the recording medium 100 of FIG. 1B has an opposite track path (OTP) where data is written starting from the lead-in area of the first recording layer L0 toward the outer area of the first recording layer and continuing from the outer area of the second recording layer L1 to its lead-out area of the second recording layer L1. The spare area is allocated to each of the recording layers L0 and L1.

In these embodiments, the spare areas can be present between the lead-in area and the user data area, between the user data area and the lead-out area and between the user data area and the outer areas. If necessary, a portion of the user data area may be used as another spare area, that is, more than one spare area may be present between the lead-in area and the lead-out area.

Figure 2:
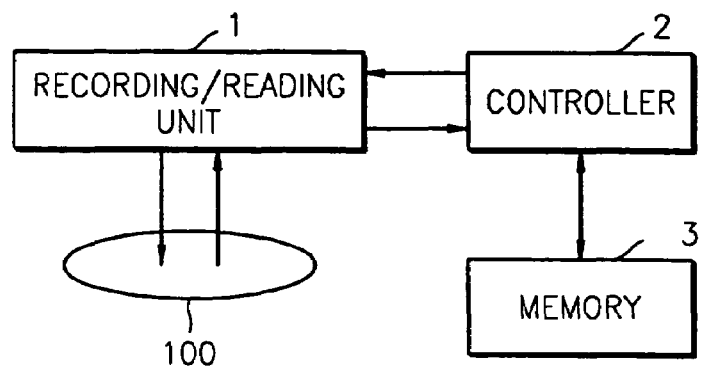
FIG. 2 is a block diagram of an apparatus for performing defect management of a recording medium, according to an embodiment of the present invention.

FIG. 2 is a block diagram of a reproducing and/or recording apparatus for performing recording medium defect management, according to an embodiment of the present invention. Referring to FIG. 2, the recording apparatus includes a recording/reading unit 1, a controller 2, and a memory 3. The recording/reading unit 1 writes data on a recording medium 100 according to an embodiment of the present invention, and reads back the data from the recording medium 100 to verify the written data.

The controller 2 performs recording medium defect management according to an embodiment of the present invention. In this embodiment, the controller 2 uses a verify-after-write method in which data is written on the recording medium 100 in predetermined units of data and the written data is then verified to detect if an area of the recording medium 100 has a defect. More specifically, the controller 2 writes user data on the recording medium 100 in predetermined units of data, verifies the written user data to detect an area of the recording medium 100 in which a defect exists, and replaces a detected defective area with a replacement area. Thereafter, the controller 2 creates information identifying both positions of the defective area and the replacement area, and stores the created information in the memory 3. If the amount of the stored information reaches a predetermined level, the controller 2 writes the stored information in a temporary defect management area (TDMA) of the recording medium 100. Information written to the TDMA is called temporary management information, corresponding to defect management information written to a defect management area (DMA). The temporary management information contains temporary defect information identifying the defective areas and corresponding replacement areas, and temporary defect management information for managing the temporary defect information. In particular, in this embodiment, the temporary defect management information includes a space bit map (SBM) that provides information for identifying available areas from unavailable areas of the recording medium 100.

The information regarding the defective area is written to the replacement area, so as to restore this information when temporary management information cannot be updated, e.g., when an unavoidable accident such as a power failure occurs, even though the defective area has been replaced with the replacement area. The information regarding the defective area specifies the position and state of the defective area. For instance, information initially designated for a defective cluster is written to a new cluster, i.e., a replacement cluster, that is a substitute for the defective cluster. The information regarding the defective cluster, in the replacement cluster, identifies the position and state of the defective cluster. Recording medium defects include defects caused during recording of data and defects caused during verification of the written data. The position information regarding the defective cluster is considered address information. For instance, if several continuous physical sector numbers (PSNs) are initially designated for the defective cluster, a first PSN of the defective cluster is recorded as the position information thereof. The size of the position information is a unit of bytes, so that all addresses of the recording medium 100 can be expressed as the position information. For instance, the position information may be about 4 bytes long. The state information regarding the defective cluster identifies whether user data written in the defective cluster is equivalent to user data written in a replacement cluster, or identifies whether the defect is a complete defect or an incomplete defect. The complete defect represents data that is completely damaged and cannot be corrected, and thus cannot be read out, whereas the incomplete defect represents data that has been corrected but is more likely to be damaged again. If the defect is a complete defect, data written in the replacement cluster may not be the same as data written in the defective cluster. This is because data, which should have been written in the defective cluster, compared to the data that actually ends up being written in the defective cluster, may be written in the replacement cluster when a complete defect occurs during recording of data that smoothly changes, such as video data.

When a user presses an eject button (not shown) of the reproducing and/or recording apparatus to remove the recording medium 100, after recording of data, the controller 2 expects write operations to have been terminated. Next, the controller 2 reads the defect information from the memory 3, provides it to the recording/reading unit 1, and controls the recording/reading unit 1 to write that defect information to the recording medium 100. The temporary management information is updated for every write operation. Alternatively, the temporary management information can be updated whenever recording is completed in a predetermined recording unit.

Also, the controller 2 sets a consistency flag when recording the temporary management information in the TDMA, in order to restore the temporary management information when the temporary management information is not updated due to an unavoidable accident such as a power failure, even though the defect area has been replaced with the replacement area. The consistency flag identifies the start of an updating of the temporary management information. For example, in this case, the consistency flag may be set to 1. When the recording medium 100 needs to be removed from a recording medium drive after recording data in predetermined units or after a write operation, the consistency flag may be reset to 0 so as to represent a successful updating of the temporary management information, while the temporary management information is finally updated.

When recording in the next recording unit starts or the recording medium 100 is reloaded, the controller 2 checks the consistency flag. If the consistency flag is 1, the controller 2 determines that the recording was abnormally terminated and starts restoration of the temporary management information and other additional information. That is, the controller 2 reads information regarding the defective area from a most recently replaced area, and updates the temporary management information and other additional information based on the read information. A detailed description thereof will be provided later.

When the recording of data is complete, i.e., when additional data will not be written to the recording medium 100 (the recording medium 100 needs to be finalized), the controller 2 controls the recording/reading unit 1 to record the most recently updated temporary management information in the Disc Management Area (DMA) of the recording medium 100.

The information regarding a defective area is also written in a replacement area when a defect occurs during reproduction of data. For instance, the position information, e.g., a first PSN of a defective cluster and state information regarding the defective are also written in a replacement cluster.

Figure 3:
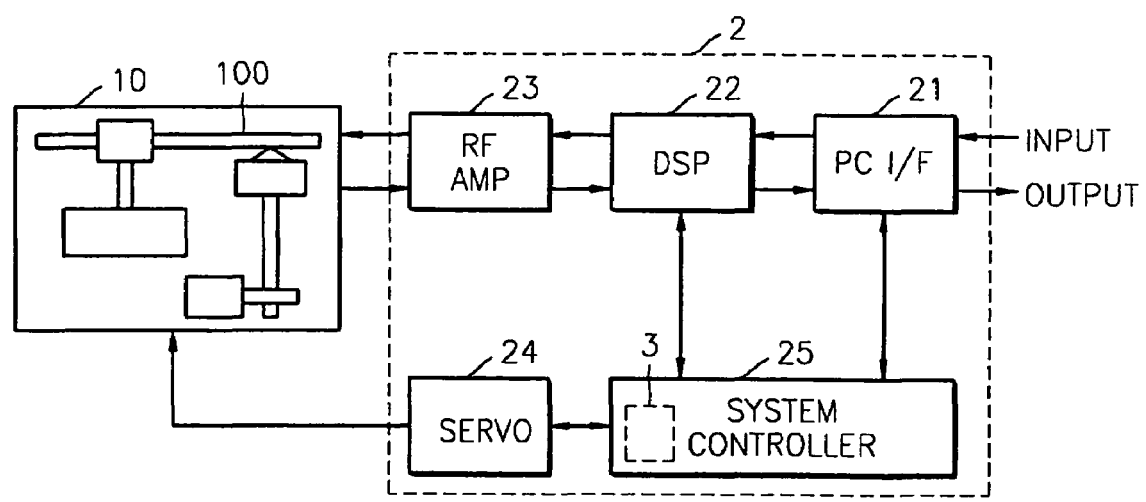
FIG. 3 is a block diagram of a reproducing and/or recording medium drive that includes the reproducing and/or recording apparatus of FIG. 2, according to an embodiment of the present invention.

FIG. 3 is a block diagram illustrating the structure of a recording medium drive included in the reproducing and/or recording apparatus of FIG. 2. Referring to FIG. 3, the recording medium drive includes a pickup 10, and corresponds to the recording/reading unit 1 of FIG. 2. A recording medium 100 is loaded onto the pickup 10. Similarly, the recording drive includes a controller 2 that has a PC I/F 21, a digital signal processor (DSP) 22, a radio-frequency (RF) amplifier 23, a servo 24, and a system controller 25. The memory 3, of FIG. 2, can be included in the system controller 25 of the controller 2.

During a write operation, the PC I/F 21 receives data to be written and a write command from a host (not shown). The system controller 25 performs an initialization of the recording medium, required for the write operation. The DSP 22 performs the error correcting code (ECC) encoding on the data transmitted from the PC I/F 21 by adding additional data, such as data parity to the data, and modulates the ECC encoded data in a predetermined data format. The RF amplifier 23 converts the data output from the DSP 22 into an RF signal. The pickup 10 then writes to the recording medium 100 using the RF signal output from the RF amplifier 23. Accordingly, the servo 24 receives a servo control command from the system controller 25 and performs servo control with respect to the pickup 10. The system controller 25 also instructs the pickup 10 to read data from the recording medium 100 or to record information, such as temporary management information, to the recording medium 100.

More specifically, the system controller 25 writes data to the recording medium 100 in predetermined numbers of clusters and verifies the data written to the clusters. If a defect is detected in a cluster, the position information regarding the defective cluster and the state information regarding the defect are stored in the memory 3. When the data verification is complete or the defect is detected, the system controller 25 receives user data from the memory 3 containing the write command and user data transmitted from the host. The user data specifies the position of the defective cluster. Then, the system controller 25 incorporates the position information regarding the defective cluster and the state information regarding the defect into the user data and writes the user data to the replacement cluster.

During a reproduction operation, the PC I/F 21 receives a read command from the host. The system controller 25 performs initialization of the recording medium 100, required for the read operation. The pickup 10 outputs a laser beam to the recording medium 100 and obtains and outputs a reflected optical signal, from the laser beam reflected from the recording medium 100. The RF amplifier 23 converts the optical signal output from the pickup 10 into an RF signal, provides data modulated from the RF signal to the DSP 22, and provides a servo signal, for servo control, obtained from the RF signal to the servo 24. The DSP 22 demodulates the modulated data, performs ECC decoding on the demodulated data, and outputs the ECC decoded data. The servo 24 performs servo control on the pickup 10, in response to the servo signal output from the RF amplifier 23 and the servo control command output from the system controller 25. The PC I/F 21 then sends the data received from the DSP 2 to the host. Also, the system controller 25 may instruct the pickup 10 to read defect management information from the recording medium 100 during the read operation.

More specifically, if an incomplete defect is detected during a read operation, in response to a read command given from the host, and if the system controller 25 determines there is sufficient time to make a replacement for the incomplete defect after the read operation or even during the read operation, the system controller 25 can reproduce the user data initially designated for the defective cluster containing the incomplete defect, by adding information regarding the defective cluster into the user data and writing the user data in a replacement cluster. The user data previously written in the defective cluster and the information regarding the defective cluster may be ECC encoded and written in the replacement cluster. Otherwise, only the user data is ECC encoded and written together with the information regarding the defective cluster in the replacement cluster.

Examples of methods of restoring data written in a defective cluster are as follows:

U.S. Pat. No. 6,367,049 illustrates a method of recording data in an ECC format with an ECC cluster consisting of 304 long distance Reed-Solomon ECCs, and a burst indicator subcode (BIS) cluster consisting of 24 BISs. During the making of the BIS cluster, a portion of control data may be allocated as a field to which information regarding defective clusters is written.

More specifically, in the recording of data in such an ECC format, when a defect is detected during a verifying process after the initial recording, user data previously written in the defective cluster containing the defect is read from a memory, in response to a write command given from a host, and is encoded into an ECC cluster. Next, control data with a physical address of the defective cluster is encoded into a BIS cluster in a portion of the control data, so as to make a physical cluster. Here, the portion of the control data is used as a field in which 16 physical addresses of a replacement cluster and information regarding the position and state of the defective cluster are recorded. Next, the physical cluster is written in a replacement cluster.

U.S. Pat. No. 6,367,049 illustrates a method of recording in an ECC format when an incomplete defect is detected, during a read operation, in response to a read command given from a host, i.e., a defective cluster containing the defect can be replaced with a replacement cluster. Thus, in view of the embodiments of the present invention, and upon application to the data structure illustrated in U.S. Pat. No. 6,367,049, a defective cluster can be reproduced and errors in an ECC cluster and a BIS cluster are corrected so as to obtain user data. Next, the user data can be encoded into an ECC cluster. Then, control data with a physical address and state information of the defective cluster are encoded into a BIS cluster, in a portion of control data, thereby obtaining a physical cluster. Here, the portion of the control data is used as a field in which 16 addresses of the replacement cluster and information regarding the position and state of the defective cluster are recorded. Next, the physical cluster can be written in the replacement cluster.

It is also possible to perform recording medium defect management on a DVD-RAM using a recording medium drive. Data can be written in an ECC format using Reed_Solomon product codes (RSPCs) (see the data format of a DVD-RAM specification). Therefore, the present invention is similarly applicable to information storage media such as DVD-RAM and DVDs on which information can be recorded using RSPCs.

Information regarding the position and state of a defective cluster can also be stored in a linking area between recording units of a recording medium when a defective cluster is replaced with a replacement cluster. To increase the reliability of recorded data, the position and state information regarding the defective cluster can preferably be written in an error correction structure in the linking area so that an error in the information can be easily corrected.

Hereinafter, a method of restoring temporary management information written to a temporary defect management area (TDMA) will be described.

Figure 5:
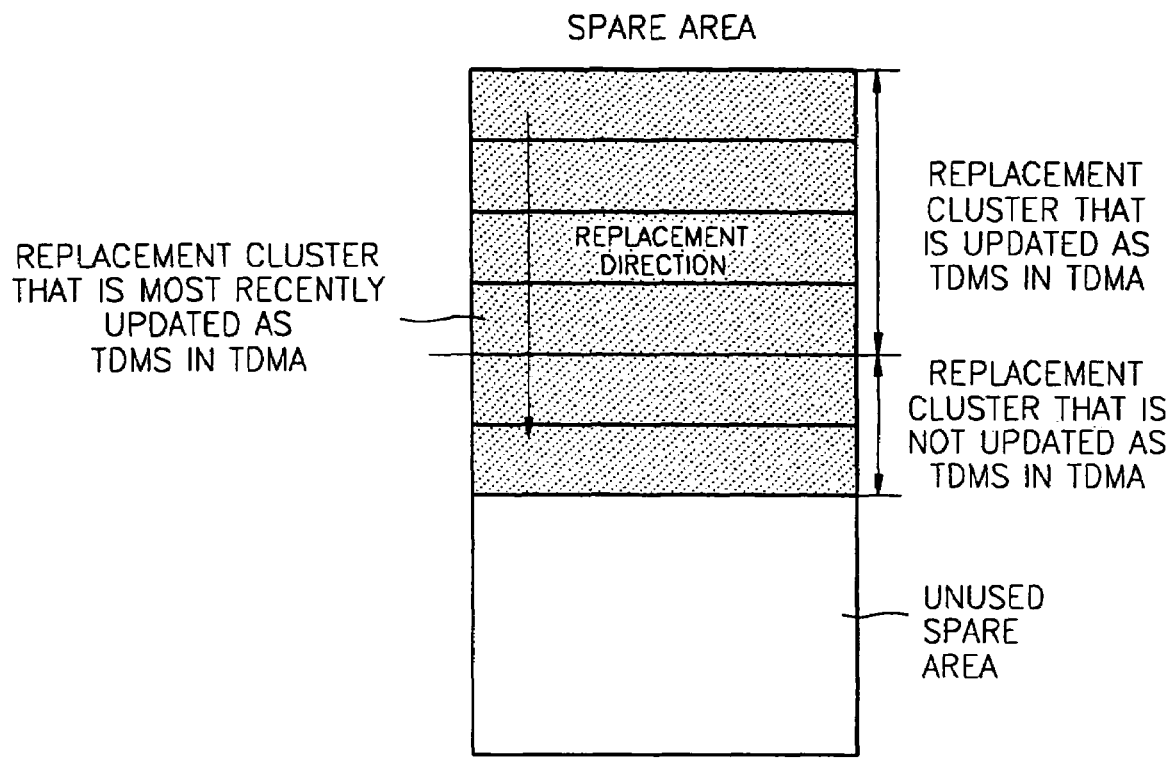
FIG. 5 illustrates a spare area in the recording medium formed when defect management of the recording medium is abnormally terminated due to an unavoidable accident such as a power failure.

FIG. 5 illustrates a recording medium spare area formed when recording medium defect management is abnormally terminated, e.g., due to an unavoidable accident such as a power failure. Referring to FIG. 5, replacement clusters, which are substitutes for defective clusters, are written to a spare area. In general, replacements for defects are sequentially formed in the spare area, starting from a portion thereof with the smallest PSN. If necessary, replacements can be sequentially formed starting from a portion of the spare area with the largest PSN. The replacement clusters are divided into two types of clusters: clusters whose information is updated with temporary management information (TDMS) and clusters whose information has not been updated. Here, the updating of the replacement cluster information indicates that recording medium defect management was successfully completed. Replacement clusters whose information has not been updated represents that recording medium defect management was abnormally terminated, requiring data written in the defective clusters have to be restored.

FIG. 6 illustrates diagrams explaining a method of updating a spare bit map (SBM) which is a type of temporary management information. In detail, FIG. 6A illustrates a recording medium recording state being described in an SBM of a recording medium 100, where recording medium defect management was abnormally terminated and restoration of data written in defective clusters is required, and FIG. 6B illustrates the actual recording state of the recording medium 100. Here, black rectangles denote portions of the recording medium 100 that contain data, gray rectangles denote portions of the recording medium 100 that actually contain data but are indicated not to include the data in the SBM, and white rectangles denote portions of the recording medium 100 that contain no data. If the recording medium defect management abnormally ends, the SBM will not reflect updated recording appropriately.

When the recording medium 100 is inserted into a recording medium drive, the recording medium drive checks a consistency flag. If the consistency flag is '1', the recording medium drive determines that the recording medium 100 was removed from a recording medium drive without successfully updating temporary management information written in a TDMA of the recording medium 100.

The recording medium drive scans a portion of the recording medium 100 containing no data, indicated in the SBM, and checks whether data is actually written in that portion. In this way, the recording medium drive corrects the SBM to precisely reflect the recording state of the recording medium 100. As mentioned above, the SBM is a map that specifies a recording medium recording state with bit values, i.e., it indicates whether clusters, which are allocated to a physically recordable area of the recording medium 100, contain data or not. The recording medium drive scans all of clusters that are determined to have no data, specified in the SBM, checks if these clusters actually do not contain data, and makes a new SBM reflecting the checking result, i.e., it updates the previous SBM. When the updated SBM is written as temporary management information in the TDMA, the updating of the SBM is complete.

FIG. 6C illustrates a recording state of the recording medium 100, with in a new SBM that precisely indicates whether the clusters contain data or not. The recording medium drive makes the new SBM by updating the previous SBM with bit values.

FIG. 7 is a flowchart illustrating a recording medium defect management method according to an embodiment of the present invention. Referring to FIG. 7, in operation 701, when a write once recording medium, on which recording medium defect management has never been performed, is loaded into a recording medium drive (or reproducing and/or recording apparatus), the recording medium drive reads temporary management information from a TDMA, stores the read information in a memory, and performs initialization of the recording medium, required for a write/read operation. In operation 702, if the loaded recording medium is not an empty recording medium, the recording medium drive reads a consistency flag set value C_flag from temporary defect management information recorded in the TDMA, and determines whether defect information regarding the write once recording medium was successfully updated. For example, if the consistency flag C_flag=1, the defect information was abnormally terminated, and if the consistency flag C_flag=0, the defect information was successfully completed. If it is determined in operation 702 that the defect information was not successfully updated, temporary defect information contained in the temporary management information recorded in the memory is read, the position of a most recently formed replacement area is detected, data written in a next replacement cluster is reproduced, and information regarding the position and state of a defective cluster is detected, in operation 703. In operation 704, a defect list naming the defective cluster and the replacement cluster is created based on the detected position and state information. In operation 705, new defect information is created based on the created defect list and the previous temporary defect information. In operation 706, the temporary defect management area TDMA is updated.

As noted above, U.S. Pat. No. 6,367,049 illustrates a method of recording data in an ECC format, in which a physical address of, and information regarding, a defective cluster are written in a replacement cluster during defect management. Thus, in view of embodiments of the present invention, and upon application to the data structure illustrated in U.S. Pat. No. 6,367,049, a most recently updated replacement cluster can be detected from a spare area of a recording medium, based on temporary defect information contained in defect management information. Next, data written in replacement clusters next to the detected replacement cluster is read. Next, an error in a BIS cluster of a replaced physical cluster can be corrected. Next, defect lists naming defective clusters and replacement clusters can be created by referring to the physical addresses and state information of the defective clusters, specified in control data. Next, new temporary defect information can be created based on the defect lists and final temporary defect information that was read and stored in a memory, when loading the write once recording medium onto a recording medium drive. Also, if data to be contained in the temporary management information exists and needs to be updated, the data is also updated and recorded as temporary management information in the TDMA. This embodiment is applicable to both write once recording media and rewritable recording media while changing particulars of data updating according to the characteristics of a recording medium used.

Figure 4:
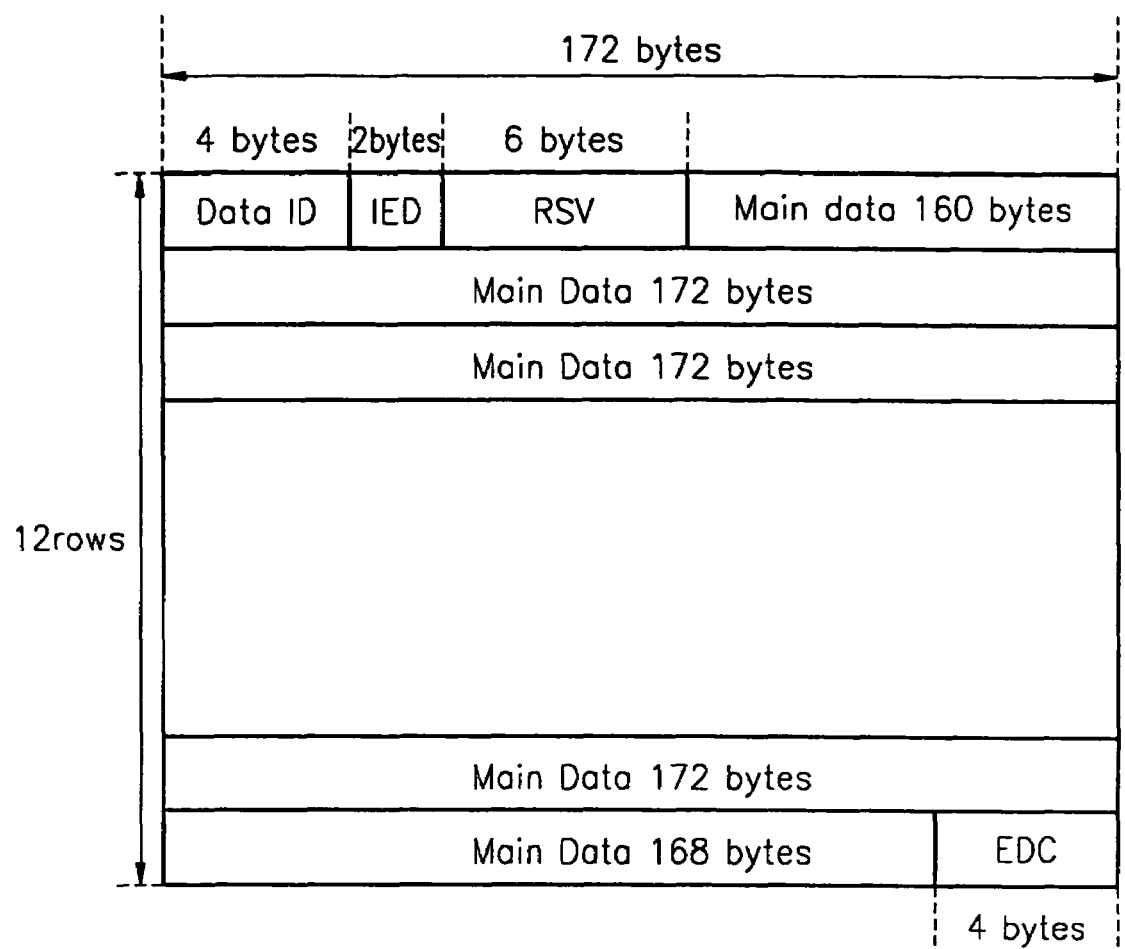
FIG. 4 illustrates a data frame format for a recording medium, according to an embodiment of the present invention.

Similarly, to restore data contained in a defective cluster of a DVD, where data is written in an RSPC format, and the physical address and state information of the defective cluster are written to a replacement block, first, a most recently formed replacement block is detected from a spare area of the DVD, based on temporary defect information contained in the TDMA. Next, data written to a next block is read and reproduced and an error in the data is corrected. Next, information regarding the positions and states of defective clusters written in a reserved area RSV shown in FIG. 4 is obtained, and defect lists naming the defective clusters and replacement clusters are created based on the obtained information. Next, new temporary defect information is created, based on the defect lists and final temporary defect information, which is read and stored in a memory when loading the DVD onto a recording medium drive. If data to be contained in the temporary management information exists and needs to be updated, the data is again updated and written as temporary management information in the TDMA. This method can be performed on both write once recording media and rewritable recording media while changing particulars of data updating, according to the characteristics of a recording medium used.

Further, to restore data written in defective clusters in a linking area containing information regarding the positions and states of the defective clusters, a most recently updated replacement block can be detected from a spare area of a recording medium, based on temporary defect information contained in temporary management information. Next, data regarding replacement clusters allotted to the replacement block is read from the linking area to obtain information regarding the positions and states of the defective clusters. Next, defect lists naming the defective clusters and replacement clusters can be created based on the read information. Next, new temporary defect information is created, based on the defect lists and final temporary defect information, which is temporary management information read and stored in a memory when the recording medium was loaded into a recording medium drive. If information to be added to the temporary management information exists and needs to be updated, the information is updated and written as the temporary management information in a TDMA. This method can also be performed on both write once recording media and rewritable recording media while changing particulars of data updating, according to the characteristics of a recording medium used.

These above data restoration methods are applicable both to write once recording media and rewritable recording media. However, the write once recording media require a defect management area and a TDMA for recording medium defect management, whereas the inclusion of the TDMA into the rewritable recording media is optional. To be compatible with rewritable recording media, it is recommended that the defect management area in the write once recording media be equal to that of the rewritable recording media, and most recently updated temporary management information written in the TDMA be written in the defect management area during recording medium finalization.

The defect management method described herein may be embodied as a computer program that can be run by a computer. The program can be stored in a computer readable medium. When the program is read and run by a computer, the defect management is performed. Here, the computer-readable medium may be a magnetic recording medium, an optical recording medium, or a carrier wave, for example.

Thus, as described above, embodiments of the present invention provide a method, apparatus, and computer readable medium for restoring temporary management information, including; temporary defect information contained which is written to temporary defect management area (TDMA).

According to embodiments of the present invention, it is possible to restore defect information written to a defect management area of each of rewritable recording media. For instance, although replacement clusters may have substituted for defective clusters, caused during a write/read operation performed on a write once recording medium (or a rewritable recording medium), a recording medium may be removed from a recording medium drive without successfully updating defect information in a TDMA/defect management area, e.g., due to an unavoidable accident such as a system power failure. Thus, even in this case, according to embodiments of the present invention, it is possible to restore temporary defect information/defect information written to the TDMA/defect management area. It is also possible to restore a spare bit map (SBM) that has not been updated.

In particular, the present invention can be advantageously applied to a recording medium drive, or reproducing and/or recording apparatus capable of checking whether a system may have been improperly powered off. However, even if a recording medium drive cannot check whether a system has been improperly powered off, the present invention enables the recording medium drive to perform a write operation and restoration of data, in response to a host command or when a recording medium is loaded into the recording medium drive.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of reproducing data on a recording medium comprising a data area disposed between a lead-in area and a lead-out area, including a user data area and at least a spare area having a replacement area for recording data for replacing a defective area occurring in the user data area, and a defect management area arranged in one of the lead-in area and the lead-out area, via defect management, comprising:

reading defect information for identifying positions of a defective area and a replacement area, and defect management information to manage the defect information from the defect management area of the recording medium; and reproducing the data from the replacement area used to replace the defective area, based on the defect information, wherein position information regarding the defective area is recorded together with the data for replacing the defective area in the replacement area located in the spare area, and wherein the defect information and detect management information recorded in the defect management area is updated in the defect management area every recording operation or in response to a predetermined number of recording operations.

2. The method of claim 1, wherein the lastly recorded defect information is recorded in the defect management area arranged in at least one of the lead-in area and the lead-out area of the recording medium.

3. The method of claim 1, wherein the position information and the state information are recorded with ECC encoded data in the replacement area of the recording medium.

* * * * *

UNITED STATES PATENT AND TRADEMARK OFFICE
CERTIFICATE OF CORRECTION

PATENT NO. : 7,408,857 B2 Page 1 of 1
APPLICATION NO. : 11/430879
DATED : August 5, 2008
INVENTOR(S) : Sung-hee Hwang et al.

It is certified that error appears in the above-identified patent and that said Letters Patent is hereby corrected as shown below:

Column 13, line 1, change "detect" to --defect--.

Signed and Sealed this

Thirtieth Day of September, 2008

JON W. DUDAS
*Director of the United States Patent and Trademark Office*